United States Patent
Eitel et al.

(10) Patent No.: US 7,153,929 B2
(45) Date of Patent: Dec. 26, 2006

(54) COPOLYMERS, DEVOID OF RUBBER, WITH LOW RESIDUAL MONOMER CONTENT AND A METHOD AND DEVICE FOR PRODUCING THE SAME

(75) Inventors: Alfred Eitel, St. Johann (AT); Klemens Kohlgrüber, Kürten (DE); Frank Weyrich, Haan (DE); Peter Rudolph, Erftstadt (DE); Hans-Jürgen Thiem, Dormagen (DE); Michael König, Shanghai (CN); Ricarda Nothelle, Shanghai (CN); Helmut Meyer, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/311,552

(22) PCT Filed: Jun. 18, 2001

(86) PCT No.: PCT/EP01/06837

§ 371 (c)(1),
(2), (4) Date: Jun. 2, 2003

(87) PCT Pub. No.: WO02/00740

PCT Pub. Date: Jan. 3, 2002

(65) Prior Publication Data

US 2004/0102593 A1    May 27, 2004

(30) Foreign Application Priority Data

Jun. 29, 2000 (DE) ................................ 100 31 766

(51) Int. Cl.
*C08F 6/10* (2006.01)
*B01D 1/06* (2006.01)

(52) U.S. Cl. ..................... 528/501; 528/481; 159/17.1; 159/26.1; 159/27.1

(58) Field of Classification Search ................ 528/481, 528/501; 159/17.1, 26.1, 27.1, 2.2
See application file for complete search history.

(56) References Cited

U.S. PATENT DOCUMENTS

| | | | |
|---|---|---|---|
| 2,467,769 A * | 4/1949 | Morrow et al. | 203/79 |
| 2,941,985 A | 6/1960 | Amos et al. | |
| 3,928,300 A | 12/1975 | Hagberg | 260/93.5 A |
| 3,966,538 A | 6/1976 | Hagberg | 159/2 R |
| 4,197,400 A | 4/1980 | Wollrab et al. | 528/500 |
| 4,198,265 A * | 4/1980 | Johnson | 159/47.1 |
| 4,215,024 A | 7/1980 | Gomez et al. | 260/23 S |
| 4,383,972 A | 5/1983 | McCurdy et al. | 422/131 |
| 4,537,734 A | 8/1985 | Morganstern | 264/22 |
| 4,542,196 A | 9/1985 | Morris et al. | 526/64 |
| 4,550,149 A | 10/1985 | Morris et al. | 526/68 |
| 4,551,309 A | 11/1985 | Morris et al. | 422/135 |
| 4,850,705 A * | 7/1989 | Horner | 366/339 |
| 4,940,472 A | 7/1990 | Hay, II et al. | 55/195 |
| 5,688,462 A * | 11/1997 | Salamon et al. | 264/328.14 |
| 5,877,271 A * | 3/1999 | Billovits et al. | 528/503 |
| 2001/0039329 A1* | 11/2001 | Wepener et al. | 528/501 |

FOREIGN PATENT DOCUMENTS

| | | |
|---|---|---|
| EP | 0 413 830 | 2/1991 |
| EP | 0 768 337 | 4/1997 |
| GB | 1 227 493 | 4/1971 |

OTHER PUBLICATIONS

Vakuum in Forschung und Praxis, (month unavailable) 1998, Nr. 4, pp. 285-293, "Statische Vakuumentgasungs-apparate bei der Herstellung und Qualitätserhöhung von Kunststoffen" by J. E. Juvet und F. A. Streiff.

* cited by examiner

*Primary Examiner*—Fred Teskin
(74) *Attorney, Agent, or Firm*—Michael A. Miller

(57) ABSTRACT

Rubber-free copolymers of unsaturated monomers selected from the group comprising styrenes and vinyl cyanides are disclosed. The copolymers that contain 65 to 80 wt. %, of styrene and 20 to 35 wt. % of acrylonitrile are characterized in their low content of residual monomers and improved physical properties. Also disclosed are a process and a device for the preparation of these copolymers.

13 Claims, 1 Drawing Sheet

Figure 1:
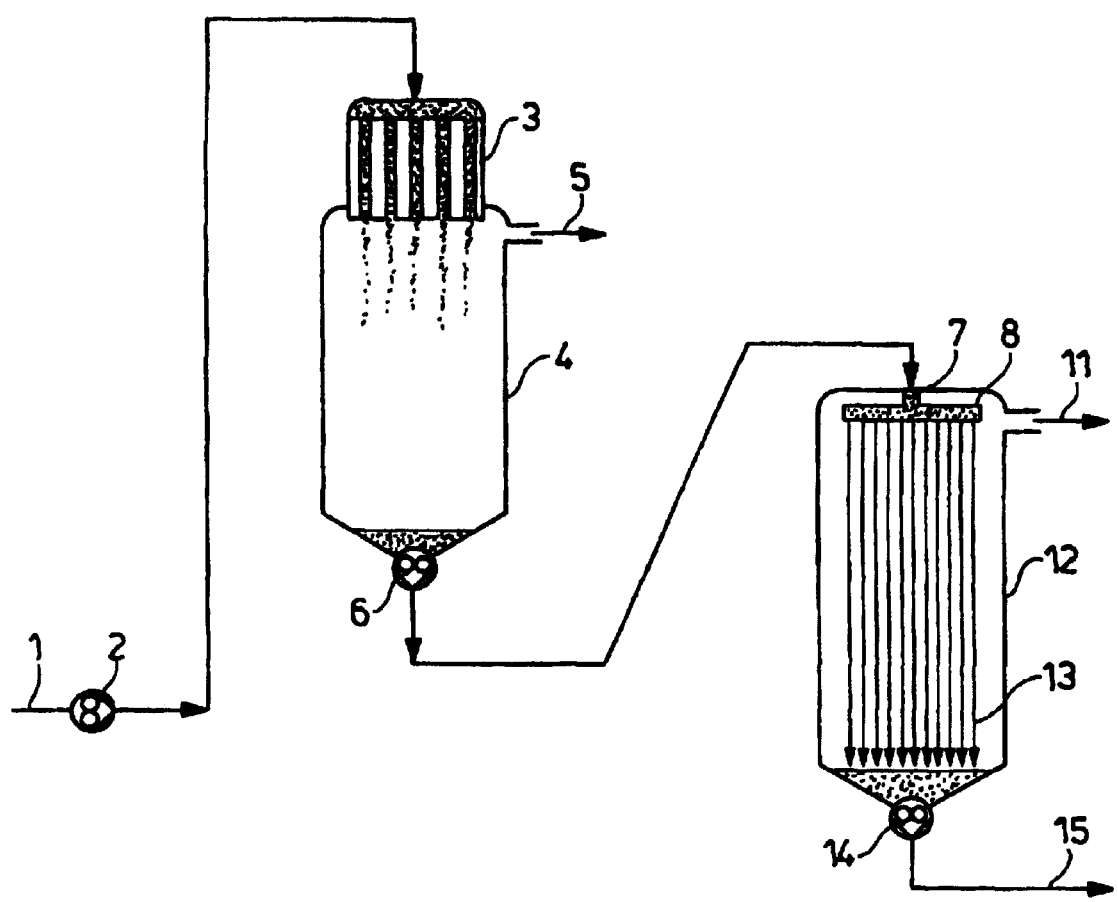

COPOLYMERS, DEVOID OF RUBBER, WITH LOW RESIDUAL MONOMER CONTENT AND A METHOD AND DEVICE FOR PRODUCING THE SAME

The present invention relates to rubber-free copolymers with low residual monomer contents and to a process and a device for the preparation thereof.

Copolymers of ethylenically unsaturated monomers are known from a multiplicity of publications. This is particularly true of the use of ABS polymers.

Polymers always contain a residual proportion of monomers of which they are composed. The removal of residual monomers from the polymers is often associated with high temperatures which leads to an unwanted intensification of the inherent colour. It is important to remove the residual monomers in a suitable manner in order to improve the properties. This is because said monomers give rise to undesirable odour pollution during use. Moreover, there are health concerns because many of the substances are toxic.

Products with low residual monomer contents are characterised not only by little odour pollution and low ecological impact; they also improve the physical properties such as, e.g., Vicat deflection temperature under load.

The removal of residual monomers by chemical means is described, for example, in EP 0 768 337 A1. Removal takes place by the addition of CH-acid organic compounds. The chemical conversion of residual monomers optionally leads to products with an undesirable ecological impact, which makes it much more difficult to use the products in practice.

The same disadvantage occurs in the process to reduce residual monomers with unsaturated fatty acids according to U.S. Pat. No. 4,215,024.

Another known process describes the reduction of residual monomers by treating the moulding compositions with electron beams. The process is much too complicated on an industrial scale, however (DE 28 43 292 A1). A process previously described by EP 0 798 314 A1 for removing residual monomers by injection of super-critical solvents into the polymer melt proves to be just as complicated.

Conventional processes are based on the removal of residual monomers using mechanically supported systems. For example, extruders (U.S. Pat. No. 4,423,960), degassing centrifuges (U.S. Pat. No. 4,940,472) or thin film evaporators (DE 19 25 063 A1) are used.

All the processes mentioned have the disadvantage that heavy moving parts are used in the apparatus which leads to cost-intensive processes subject to breakdown and wear.

Another widely used technique involves preheating the material and then removing residual monomers therefrom by devolatilisation (flashing). This process may be carried out in a single stage or in multiple stages (DE 24 00 661 A1). Flashing inevitably leads to temperature peaks, however, which leads to a deterioration of the material.

In order to overcome these disadvantages, processes were proposed which introduce entrainers, such as water, as an additional component (Vakuum in Forschung und Praxis 1998, No. 4, 285–293). It is important to disperse the entrainer as well as possible in the high-viscosity melt if the process is to operate successfully. To achieve this, special mixers of complex design are required. No addition of water is required if the polymer is already prepared in the aqueous phase. By applying a vacuum and degassing under vacuum, it is possible to obtain low residual monomer contents. It is apparent, however, that residence times of up to one hour are required to obtain very low residual monomer contents (DE-OS 25 47 140). High temperatures over such long periods lead to an unacceptable intensification of the colour of the material.

A generic process and a device for the preparation and concentration by evaporation of styrenic/alkenyl nitrile copolymers is known from DE 33 34 338 A1. Continuous bulk polymerisation of styrenic and alkenyl nitrile monomers takes place here in a two-step process in which, in a first step, the ratio of styrene monomer to alkenyl nitrile monomer is adjusted and, in a second step, a heat treatment is carried out in order to volatilise the volatile components. It is not possible, however, to prepare ultra-pure products in this way. In the first step, the concentration is raised to about 65% and in the second evaporation step a concentration of 99.8% is obtained. Such a purity no longer meets present-day requirements, however.

The object of the present invention is, therefore, to provide copolymers with low residual monomer contents and a process and a device for the preparation thereof, wherein the product thus prepared has extreme purity. Moreover, it is desirable to obtain a good throughput in a construction of simple design.

With regard to the end product, the object is achieved by copolymers of ethylenically unsaturated monomers ("vinyl monomers") such as vinyl acetate, styrene, alpha-methylstyrene and acrylonitrile which have a low residual monomer content, namely less than 20 ppm, preferably 10 ppm of acrylonitrile and less than 200 ppm, preferably 100 ppm of styrene and less than 200 ppm, preferably 100 ppm of ethyl benzene.

The determination is carried out by gas chromatography using the head space method.

Surprisingly, it was found that, without the disadvantages described above, it was possible to provide products with low residual monomer contents when solutions of rubber-free copolymers are brought to concentrations of about 99.8% in a first step by gentle concentration by introducing energy with simultaneous evaporation in a tube evaporator and, in a second step without intermediate heating, further removal of the monomers is carried out in a gentle manner in a strand evaporator in a suitable manner. Unlike the generic prior art, a very high purity is thus obtained in the very first step.

The object in terms of the process is achieved by bringing solutions of the products to concentrations greater than/ equal to 99.8% in a first step of gentle concentration by introducing energy with simultaneous evaporation, and removing further monomers in a second step without intermediate heating.

The object in terms of the device is achieved by means of a tube evaporator in the first step, a strand evaporator in the second step and devices for conveying the product solutions.

The above-mentioned copolymers of ethylenically unsaturated monomers are used according to the invention.

More particularly, rubber-free vinyl polymers are suitable.

Preferred vinyl polymers (A.1) are copolymers of, on the one hand, styrene, α-methylstyrene, styrene substituted on the nucleus, or mixtures (A.1.1) and, on the other hand, acrylonitrile (A.1.2).

The copolymers contain preferably 68 wt. % to 77 wt. % of constituent A.1.1 and 23 wt. % to 32 wt. % of constituent A.1.2.

The most well known are styrene-acrylonitrile copolymers which may be prepared by free-radical polymerisation, particularly solution or bulk polymerisation. Copolymers A.1 preferably have melt volume indices from 5 to 60 cm$^3$/10 min, measured at 220° C. with a 10 kg load (ISO 1133), corresponding to weight-average molecular weight distributions $M_w$ from 80 to 200 kg/mole.

Figure 2:
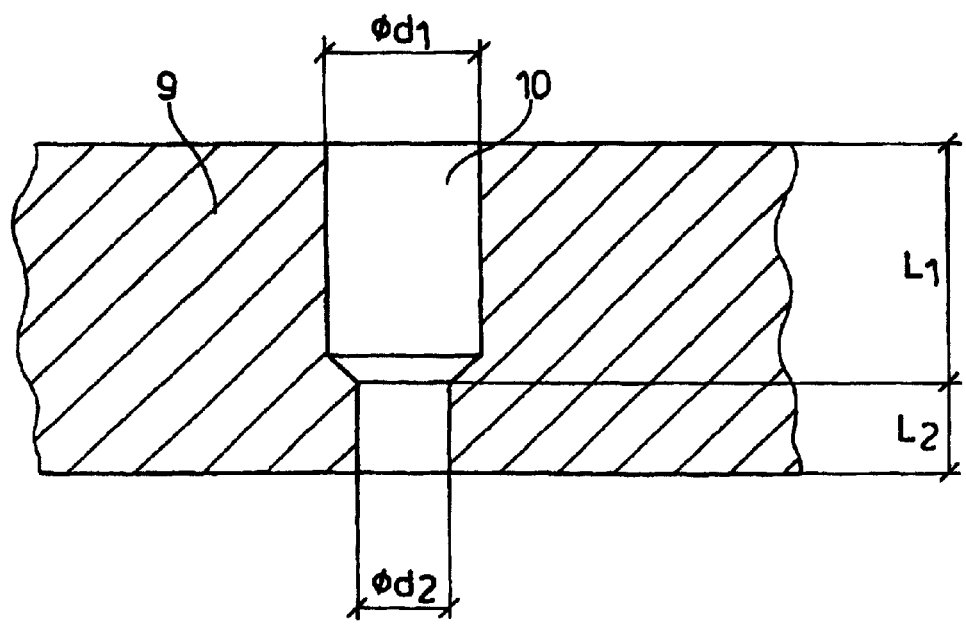

The invention is explained in more detail below on the basis of a drawing representing only one preferred embodiment, wherein FIG. 1 shows a schematic construction of the device according to the invention, and FIG. 2 shows a preferred design of a conically stepped bore in the tube wall of the tube manifold.

As can be seen from FIG. 1, a solution 1 of a copolymer of acrylonitrile and styrene in a mixture of ethyl benzene and styrene with a concentration of the polymer of 60% to 70%, which was obtained by polymerisation in a mixture of styrene and acrylonitrile and optionally an additional solvent such as ethyl benzene, toluene or methyl ethyl ketone, was fed from above at a temperature from 140° C. to 165° C. by means of a gear pump 2 into a vertically arranged tube bundle apparatus.

The bundle of tubes 3 contained therein is preferably placed on a separating vessel or cyclone 4 in which the separation of the gas phase produced in the tubes from the polymer phase takes place. For the isolation of the polymer down to very low monomer contents of less than 0.2% it is necessary to reduce the pressure in the separator using a vacuum system to a pressure from 50 mbar to 100 mbar, preferably 20 mbar to 30 mbar. The largely de-monomerised polymer phase collects in the well in separating vessel 4. The gases are preferably drawn off at the side or via a top line and recycled to polymerisation.

For the purpose of raising the concentration which takes place in a gentle manner according to the invention by introducing energy with simultaneous evaporation, the tube bundle evaporator is heated with liquid or vapour-phase heat transfer media. Heating takes place in such a way that the temperature in the outlet is 165° C. to 240° C., preferably 220° C. Jacket heating has temperatures from 190° C. to 240° C., preferably 220° C. to 230° C.

A particular feature of the process according to the invention is that no apertures or narrowings are provided for inside the tubes, i.e. the pressure drop of the flow in the tubes is small. Depending on the heating temperature, viscosity of the polymer, throughput and tube geometry, it is less than 10 bar, preferably less than 5 bar (abs.).

Due to the low pressure in the tube, if the heating temperature is sufficiently high, evaporation of the solution already starts inside the tubes, preferably shortly after the solution enters the tubes. Due to commencing evaporation, a voluminous foam is produced, as a result of which the residence time in the tubes is greatly reduced compared with single-phase flow. Surprisingly, due to the two-phase system, the heat transfer is improved compared with a single-phase system, as a result of which good concentration results can be achieved with simultaneously low heating temperatures. Due to the evaporative cooling commencing during evaporation, overheating of the product is avoided in comparison with flash evaporation. Due to the occurrence of the two-phase system inside the tubes with its positive effect on heat transfer, residence time and product temperature (evaporative cooling), gentle concentration by evaporation, i.e. with low temperatures and short residence times is guaranteed.

The throughput of polymer per tube is 1 to 10 kg/h, preferably 2 to 5 kg/h. The tube length is preferably 1 m to 2.5 m, the tube diameter is preferably 8 mm to 23 mm. In order to improve heat transfer, provision may also be made for static mixers (e.g. of the Kenics type) in the tubes. The mixers also have the advantage that thorough mixing takes place inside the tubes, so overheating of layers near the walls is avoided.

In order to obtain a uniform distribution of the material stream entering tube bundle 3 on the individual tubes in the tube bundle apparatus described, a distributor plate (perforated plate) which brings about an increased pressure drop in the space in front of the tubes may optionally be mounted above the tube inlet.

The residual monomer content in the product is already 1000 ppm to 2000 ppm, according to the invention, after it has passed through the tube bundle evaporator.

The product isolated to these residual contents is collected in the well of separation vessel 4 and discharged from the separator with a gear pump or spiral pump 6 and conveyed to the downstream strand evaporator.

Here, in a particular embodiment, the product is distributed from one central tube 7 by way of a tube manifold 8 to a multiplicity of individual tubes 9 which, in a particular embodiment, have conically tapering bores 10 or, as shown in FIG. 2, conically tapering bores 10 in sections. Preferably, the diameter $d_1$ of the upper bore is 5 mm to 10 mm and its length $b_1$ is 5 mm to 30 mm and the diameter $d_2$ of the lower bore is 0.5 mm to 5 mm with a section length $L_2$ from 2 mm to 10 mm.

In order to guarantee a uniform distribution of the solution over the tubes, the latter are heated. The tube manifold 8 is situated at the upper end of a vertically arranged, jacket-heated container 12 with a height from 2 m to 10 m, preferably 4 m to 5 m evacuated to an absolute pressure from 0.5 mbar to 10 mbar, preferably 0.5 mbar to 2 mbar by means of vapour escape 11. Thin, stable polymer filaments 13 form between the bottom of the container and the orifices of the tube manifold 8. The polymer degases on the way to the bottom of the container with an average residence time of less than 15 sec.

According to the invention, a product quantity of preferably 100 g/h to 200 g/h passes through each orifice with a diameter from 1 mm to 4 mm, preferably from 2 mm to 3 mm. The product collects in the preferably conical well of container 12 and is conveyed with a gear pump or spiral pump 14 as a melt 15 to granulation or to further processing. The residual monomer contents after this degassing step are less than 100 ppm of styrene, less than 100 ppm of ethyl benzene and less than 10 ppm of acrylonitrile.

EXAMPLE

A SAN solution prepared by free-radical bulk polymerisation and having a composition of 65 wt. % of SAN, 18 wt. % of styrene and 17 wt. % of ethyl benzene was concentrated by evaporation in a tube bundle apparatus with 700 tubes. The temperature of the solution at the inlet was 165° C., the throughput of SAN/tube was 1.5 kg/h. The tube length was 1 m, the internal diameter of the tubes 23 mm. Static mixers of the Kenics type were incorporated inside the tubes. The pressure in the separator downstream of the tube bundle was 55 mbar.

The height of the strand evaporator was 4 m, the throughput of SAN per orifice 105 g/h (10,000 orifices). The pressure in the separator was kept at 3 mbar. The tube evaporator including separator and the strand evaporator were heated uniformly to 230° C. The residual contents obtained after the strand evaporator were:

5 ppm of acrylonitrile, 50 ppm of ethyl benzene and 70 ppm of styrene. The pressure drop over the tubes of the tube bundle apparatus was 2 bar. The acrylonitrile content of the polymer was 28%, the melt index was 54 cm$^3$/10 min at 220° C.

The invention claimed is:

1. A process for the preparation of rubber-free copolymers of ethylenically unsaturated monomers selected from the group consisting of styrenes and vinyl cyanides containing 65 wt. % to 80 wt. % styrene and 20 wt. % to 35 wt. % vinyl cyanide with a low residual monomer content, wherein concentration takes place in two steps, characterized in that solutions of the rubber-free copolymers are brought to concentrations of greater than or equal to 99.8% in a first step of concentration by introducing energy with simultaneous evaporation in tubes in a tube evaporator and, in a second step without intermediate heating, further removal of the monomers is carried out in a strand evaporator.

2. A process according to claim 1, characterized in that the heating in the first step results in an outlet temperature of 165° C. to 240° C.

3. A process according to claim 1, characterized in that the tube evaporator in the first step is working at a pressure from 50 mbar to 100 mbar.

4. A process according to claim 1, characterized in that a throughput through the tubes in the first step is 1 to 10 kg/h.

5. A process according to claim 1, characterized in that the strand evaporator in the second step is working at a pressure from 0.5 mbar to 10 mbar.

6. A process according to claim 1, characterized in that the tubes are heated.

7. The process of claim 1, wherein said vinyl cyanide is acrylonitrile.

8. A device of carrying out a process according to claim 1, characterized by a tube evaporator having tubes in the first step, a strand evaporator in the second step and equipment for conveying the product solutions.

9. A device according to claim 8, characterized in that the length of the tubes in the first step is 1 m to 2.5 m and the internal diameter is 8 mm to 23 mm.

10. A device according to claim 8, characterized in that static mixing components are provided in the tubes.

11. A device according to claim 8, characterized in that the product in the strand evaporator is introduced by way of a tube manifold to tubes with bores with a diameter from 1 mm to 4 mm and the tubes are situated in a vertically arranged apparatus with a height from 2 m to 10 m.

12. A device according to claim 8, characterized in that that tubes include conically shaped bores.

13. A device according to claim 8, characterized in that the tube evaporator includes a tube manifold having orifices wherein a throughput per orifice is 100 g/h to 200 g/h.

* * * * *